United States Patent
Castaneda Zuniga et al.

(10) Patent No.: US 11,136,438 B2
(45) Date of Patent: Oct. 5, 2021

(54) PROCESS FOR THE PREPARATION OF POLYOLEFIN PARTICLES

(71) Applicant: SABIC Global Technologies B.V., Bergen op Zoom (NL)

(72) Inventors: Diego Mauricio Castaneda Zuniga, Maastricht (NL); Jan Nicolaas Eddy Duchateau, Paal (BE); Peter Neuteboom, Hoensbroek (NL); Zeljko Knez, Maribor (SI)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 14 days.

(21) Appl. No.: 15/743,865

(22) PCT Filed: Jun. 30, 2016

(86) PCT No.: PCT/EP2016/065343
§ 371 (c)(1),
(2) Date: Jan. 11, 2018

(87) PCT Pub. No.: WO2018/001486
PCT Pub. Date: Jan. 4, 2018

(65) Prior Publication Data
US 2019/0002646 A1    Jan. 3, 2019

(30) Foreign Application Priority Data
Jul. 13, 2015 (EP) .................................... 15176501

(51) Int. Cl.
*C08J 3/00* (2006.01)
*B01J 2/00* (2006.01)
(Continued)

(52) U.S. Cl.
CPC .................. *C08J 3/122* (2013.01); *B01J 2/04* (2013.01); *C08J 3/226* (2013.01); *D06N 7/00* (2013.01);
(Continued)

(58) Field of Classification Search
CPC ....... B01J 2/04; B01J 2/00; C08J 3/122; C08J 3/00; C08J 3/10; C08J 3/12; C08J 3/20;
(Continued)

(56) References Cited

U.S. PATENT DOCUMENTS 5,696,195 A   12/1997   Tuminello et al.
6,034,170 A   3/2000    Tuminello et al.
(Continued)

FOREIGN PATENT DOCUMENTS

EP    0838318 A2    4/1998
EP    1834978 A1    9/2007
(Continued)

OTHER PUBLICATIONS

Beyler, Craig L., and Marcelo M. Hirschler. "Thermal decomposition of polymers." SFPE handbook of fire protection engineering 2 (2002). (Year: 2002).*

(Continued)

*Primary Examiner* — Jacob T Minskey
*Assistant Examiner* — Matthew Hoover
(74) *Attorney, Agent, or Firm* — Cantor Colburn LLP

(57) ABSTRACT

A process for producing polyolefin particles from a polyolefin composition, comprising the steps of:
a) providing a melted composition of a polyolefin and
b) providing particles from the melted composition by:
b1) mixing a first flow of a supercritical fluid in the melted composition in a pressure vessel to obtain a solution saturated with the supercritical fluid and
b2) passing the solution from the pressure vessel through a throttling device to a spraying tower to expand the solution
(Continued)

to obtain the polyolefin particles in the spraying tower, wherein a second flow of a supercritical fluid is injected in the throttling device, wherein the supercritical fluid is a supercritical fluid of a substance selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether and $SF_6$ and combinations thereof.

18 Claims, 1 Drawing Sheet

(51) Int. Cl.
*D06N 7/00* (2006.01)
*C08J 3/12* (2006.01)
*B01J 2/04* (2006.01)
*C08J 3/22* (2006.01)

(52) U.S. Cl.
CPC ........ *D06N 7/0071* (2013.01); *C08J 2323/06* (2013.01)

(58) Field of Classification Search
CPC .... C08J 3/22; C08J 3/226; D06N 7/00; D06N 7/007; D06N 7/0071
See application file for complete search history.

(56) References Cited

U.S. PATENT DOCUMENTS

| | | | |
|---|---|---|---|
| 6,056,791 A | 5/2000 | Weidner et al. | |
| 2007/0270064 A1 | 11/2007 | Aseere | |
| 2009/0156737 A1 | 6/2009 | Schindler et al. | |
| 2012/0112374 A1* | 5/2012 | Ohtani | G03G 9/08755 264/9 |
| 2012/0258150 A1* | 10/2012 | Rauckhorst | C11D 3/505 424/401 |
| 2013/0234350 A1* | 9/2013 | Osswald | B01J 2/20 264/12 |

FOREIGN PATENT DOCUMENTS

| | | | | |
|---|---|---|---|---|
| GB | 2242434 A | 10/1991 | | |
| GB | 2322326 A | 8/1998 | | |
| WO | 9600610 A1 | 1/1996 | | |
| WO | 2004110603 A2 | 12/2004 | | |
| WO | 2007057326 A1 | 5/2007 | | |
| WO | 2009039518 A2 | 3/2009 | | |
| WO | 2013146558 A1 | 10/2013 | | |
| WO | WO2014081458 A1 * | 5/2014 | ............ | C08F 110/02 |
| WO | WO-2014081458 A1 * | 5/2014 | ....... | C09D 123/0869 |

OTHER PUBLICATIONS

Rylander, Jessica, English translation of EP1834978, Sep. 19, 2007 (Year: 2007).*
A. Furumiya, Y. Akana, Y. Ushida, T. Masuda and A. Nakajima, "Relationship Between Molecular Characteristics and Physical Properties of Linear Low Density Polyethylenes", Pure & Appl. Chem., vol. 57, No. 6, pp. 823-832, 1985. (Year: 1985).*
Abedin, "Micronization of Polyethylene Wax in an Extrusion Process using Supercritical Carbon Dioxide," Thesis Presented to the University of Waterloo, Canada (2011); 145 Pages.
Abedin, "Micronization of Polymer in an Extrusion Process using Supercritical Carbon Dioxide," Institute for Polymer Research (2011)—University of Waterloo Canada; 35 Pages.
Fukne-Kokot et al., "Comparison of different methods for determination of the S-L-G equilibrium curve of a solid component in the presence of a compressed gas," Fluid Phase Equilibria 173 (2000) 297-310.
International Search Report for International Application No. PCT/EP2016/065343; International Filing Date: Jun. 30, 2016; dated Mar. 22, 2017; 5 Pages.
Jung et al., "Particle design using supercritical fluids: Literature and patent survey," Journal of Supercritical Fluids 20 (2001) 179-219.
Knez et al., "Particles formation and particle design using supercritical fluids," Current Opinion in Solid State and Materials Science, Elsevier Science LTD, Oxford, GB, vol. 7, Jan. 1, 2003, pp. 353-361.
Machine Translation of EP1834978; Date of Publication: Sep. 19, 2007; 10 Pages.
Martin et al., "Micronization processes with supercritical fluids: Fundamentals and mechanisms" Advanced Drug Delivery Reviews 60 (2008) 339-350.
Nalawade, "Polymer Melt Micronisation using Supercritical Carbon Dioxide as Processing Solvent," (2005) 145 Pages.
P.D. Iedema et al, "A Development of MWD and Branching During Peroxide Modification of High-Density Polyethylene by SEC-MALS and Monte Carlo Simulation," Polymer; Jun. 2013, pp. 4093-4104, vol. 54.
Peacock, "Handbook of Polyethylene: Structures, Properties, and Applications," (2000) Marcel Dekker; pp. 43-66.
Weidner, High pressure micronization for food applications,: J. of Supercritical Fluids 47 (2009) 556-565.
Written Opinion of the International Searching Authority for International Application No. PCT/EP2016/065343; International Filing Date: Jun. 30, 2016; dated Mar. 22, 2017; 7 Pages.

* cited by examiner

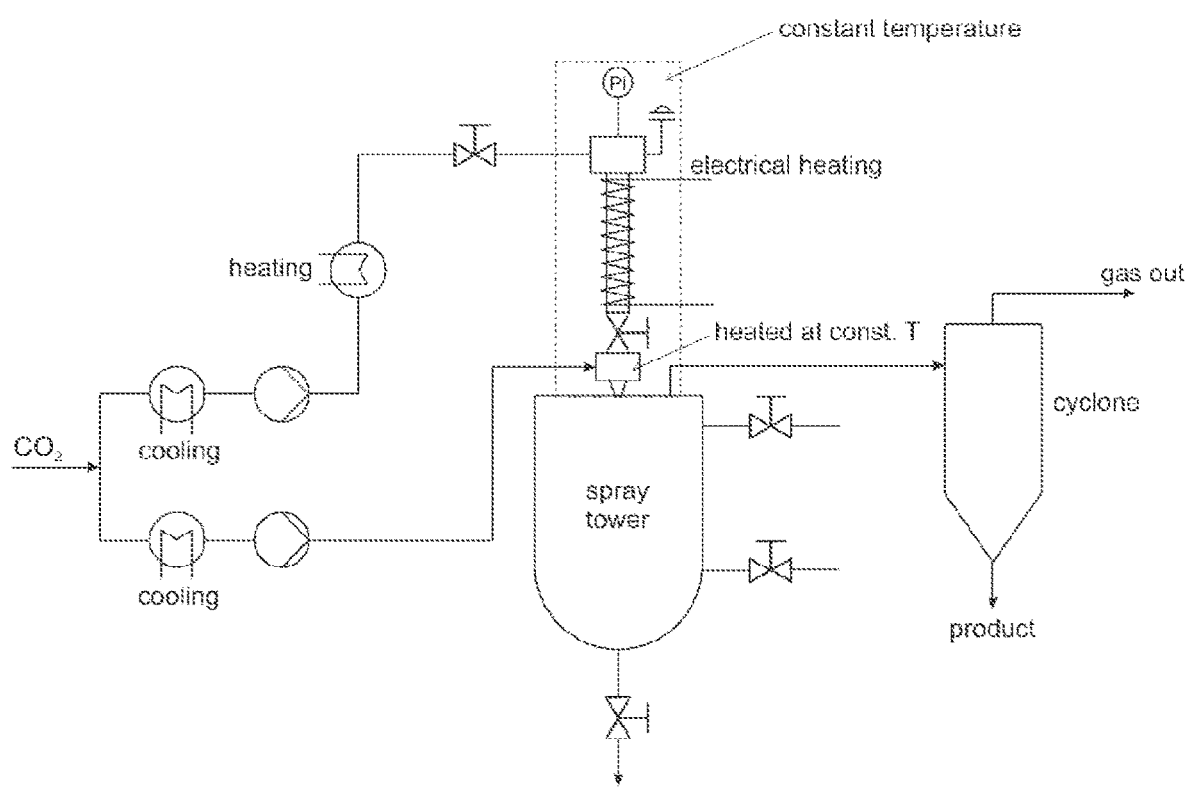

PROCESS FOR THE PREPARATION OF POLYOLEFIN PARTICLES

CROSS REFERENCE TO RELATED APPLICATIONS

This application is a 371 of International Application No. PCT/EP2016/065343, filed Jun. 30, 2016, which claims priority to European Application No. 15176501.3, filed Jul. 13, 2015 which are incorporated herein by reference in their entirety.

The invention relates to a process for producing particles by the Particle from Gas Saturated Solution (PGSS) process.

It is known to prepare particles by the PGSS process. The PGSS process uses a supercritical fluid, typically $CO_2$, to saturate a substance from which the particles are to be made. The PGSS process is described in U.S. Pat. No. 6,056,791, WO2007057326 and Z. Knez, E. Weidner/Current Opinion in Solid State and Materials Science 7 (2003) 353-361. The PGSS process can be used to create micro-sized particles with the ability to control particle size distribution. PGSS also allows the production of particles that are solvent-free. In the PGSS process, a compressible fluid is absorbed by a polymer melt under high pressure and the resultant solution is then expanded so that particles are form during the expansion process.

The driving force of the PGSS process to form solid particles is a sudden temperature drop of the saturated solution below the melting point of the polymer. This occurs as the solution is expanded from a working pressure to atmospheric conditions due to evaporation and/or Joule-Thomson effect. The rapid cooling of the polymer solution causes the solidification of the polymer. The cooling is sudden and homogeneous throughout the solution; therefore, homogenous nucleation results in the particle formation. The particles produced are collected in the spraying tower (also called expansion chamber).

While it has been successfully shown that particles can be prepared by the PGSS process, the substances which have been subjected to the PGSS process hitherto are limited. U.S. Pat. No. 6,056,791 mentions particle formation for glyceride mixtures. US2009156737 mentions particle formation of polymeric additives.

Further, problems related to the types of the substances to be subjected to the PGSS process and the effects of process parameters on the properties of the obtained particles have not been investigated in detail.

EP0838318A2 describes a method for treating HDPE to remove organic contaminants by the use of supercritical fluids. The method is used for producing products which meet the requirements for food and healthcare applications. EP0838318A2 does not disclose producing particles.

EP1834978 discloses micronization of a polymer comprising providing a polymer solution or melt; increasing the solution pressure; adding and admixing a liquid under the formation of a solution of the liquid in the solution or a liquid mixture of the liquid with the solution; introducing the obtained solution or liquid mixture to an expansion device possibly using a nozzle; introducing the obtained mixture from solid particle forming polymer and gaseous liquid into a retention container. EP1834978 mentions preventing the melt to be clogged in the nozzle.

WO2013/146558 discloses a method for producing particles by bringing a first compressive fluid and raw materials containing a pressure plastic material into contact with each other to melt the pressure plastic material, and jetting a melt obtained by melting the pressure plastic material, with supplying a second compressive fluid containing nitrogen to the melt, to thereby form particles.

It is an object of the present invention to provide a process for producing polyolefin particles by the PGSS process Accordingly, the present invention provides a process for producing polyolefin particles from a polyolefin composition, comprising the steps of:
 a) providing a melted composition of a polyolefin and
 b) providing particles from the melted composition by:
  b1) mixing a first flow of a supercritical fluid in the melted composition in a pressure vessel to obtain a solution saturated with the supercritical fluid and
  b2) passing the solution from the pressure vessel through a throttling device to a spraying tower to expand the solution to obtain the polyolefin particles in the spraying tower,
  wherein a second flow of a supercritical fluid is injected in the throttling device.

The present invention provides a process for producing polyolefin particles from a polyolefin composition, comprising the steps of:
 a) providing a melted composition of a polyolefin and
 b) providing particles from the melted composition by:
  b1) mixing a first flow of a supercritical fluid in the melted composition in a pressure vessel to obtain a solution saturated with the supercritical fluid and
  b2) passing the solution from the pressure vessel through a throttling device to a spraying tower to expand the solution to obtain the polyolefin particles in the spraying tower,
  wherein a second flow of a supercritical fluid is injected in the throttling device,
  wherein the supercritical fluid is a supercritical fluid of a substance selected from the group consisting of CO2, NH3, H2O, N2O, CH4, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether and SF6 and combinations thereof.

It was found that a melted composition of polyolefin may in some cases have such a high viscosity that it cannot be processed by the PGSS process if the supercritical fluid is fed only to the pressure vessel. It was found according to the process of the invention that the injection of a further flow of a supercritical fluid allows producing clean polyolefin particles with controlled particle size distribution even for a high viscosity polyolefin.

In the process according to the present invention, a melted composition of a polyolefin is first provided in a pressure vessel. A flow of a supercritical fluid is mixed into the melted composition in the pressure vessel to obtain a solution saturated with the supercritical fluid. The solution saturated with the supercritical fluid is passed from the pressure vessel to the throttling device and subsequently to the spraying tower. In the throttling device, a further flow of a supercritical fluid is introduced. This further addition of the supercritical fluid was found to allow the preparation of particles from a wide range of polyolefin which otherwise cannot be processed by the PGSS process. This further addition of the supercritical fluid further leads to a small particle size and a narrower particle size distribution.

The further addition of the supercritical fluid provides a rapid solidification of the viscous melted composition after expansion. The further addition of the supercritical fluid provides a small excess of compressed fluid within the system that will serve as extra cooling when the solution is expanded in the spraying tower to form particles. This promotes that the crystallization temperature of the newly formed polymer droplets after expansion is reached faster and the solid particles are cooled further. When cooling is poor, the droplets will have a longer residence time as a molten polymer. This leads to the droplets combining with other droplets to form lumps before solidifying, leading to a larger particle size and a broader particle size distribution, or even a failure in the formation of the droplets.

Accordingly, compared to the cases where the second flow is absent, a spraying tower with a smaller length may be used since the particles are formed faster in the spraying tower. This is advantageous in that a smaller and less expensive system can be used.

Further, the amount of the supercritical fluid required for the production of the particles may be smaller when the supercritical fluid is provided as the first flow and the second flow at different locations according to the process of the invention, compared to when the supercritical fluid is provided only in the pressure vessel. The particle size distribution may be better controlled and the particle size may be smaller.

The temperature behavior of the supercritical fluid during the expansion is described by the Joule Thomson coefficient as explained for instance in the book (Thermodynamics: An Engineering Approach, 5th Ed Cengel, Yunus A.; Boles, Michael A. Published by McGraw-Hill College, Boston, Mass., 2006; ISBN 10: 0072884959/ISBN 13: 9780072884951). The magnitude of the cooling will depend on the type of the supercritical fluid and the operating conditions of the process.

Typically, step b1) is performed by feeding the melted composition of the polyolefin in a pressure vessel, adding a first flow of a supercritical fluid to the melted composition in the pressure vessel through a high pressure pump and mixing the supercritical fluid and the melted composition. The mixing may be performed by a mixing element, which may be for example a static mixer, a stirrer or an extruder. The mixing element is preferably a static mixer.

Preferably, in step b1), the pressure vessel has a pressure of 100 to 1000 bar, more preferably 150 to 800 bar, more preferably 200 to 600 bar, more preferably 250 to 500 bar. The pressures in the pressure vessel and in the throttling device are preferably substantially the same, for example the pressure in the pressure vessel is at most 20 bar, at most 15 bar, at most 10 bar or at most 5 bar higher than the pressure in the throttling device.

Preferably, in step b1), the solution saturated with the supercritical fluid in the pressure vessel has a temperature of 100 to 400° C., more preferably 150 to 350° C., more preferably 175 to 300° C.

Preferably, the first flow of the supercritical fluid has a temperature which is substantially the same as the temperature of the melted composition of the polyolefin to which the first flow of the supercritical fluid is added. Preferably, the first flow of the supercritical fluid is fed to the pressure vessel at a temperature of 100 to 400° C., more preferably 150 to 350° C., more preferably 175 to 300° C.

When the melted composition of the polyolefin is saturated with the supercritical fluid, i.e. when the solution saturated with the supercritical fluid is obtained in the pressure vessel, it is passed on to the throttling device. In the throttling device, a further flow of a supercritical fluid is introduced.

The throttling device may be any element which has a suitable opening which provides a diameter restriction which gives the pressure increase. The throttling device includes nozzles, capillaries, valves. The throttling device is connected with the pressure vessel via a valve which controls whether throttling device is in a fluid connection with the pressure vessel. The solution is introduced to the throttling device by opening the valve.

The throttling device is heated to such a temperature that there is no substantial change in the temperature of the solution when the solution enters and passes the throttling device after the addition of the second flow of the supercritical fluid. Preferably, the solution in the throttling device has a temperature of 100 to 400° C., more preferably 150 to 350° C., more preferably 175 to 300° C.

Preferably, the second flow of the supercritical fluid has a temperature which is substantially the same as the temperature of the solution saturated with the supercritical fluid to which the second flow of the supercritical fluid is added. Preferably, the second flow of the supercritical fluid is fed to the throttling device at a temperature of 100 to 400° C., more preferably 150 to 350° C., more preferably 175 to 300° C.

The spraying tower has an atmospheric pressure. Due to the pressure difference, the solution saturated with the supercritical fluid is introduced from the throttling device to the spraying tower. The temperature in the spraying tower is below the melting temperature of the melted composition. Polyolefin particles are formed in the spraying tower.

Polyolefin

The polyolefin is preferably polypropylene or polyethylene, for example linear low density polyethylene (LLDPE), low density polyethylene (LDPE), high density polyethylene (HDPE).

The production processes of LDPE, HDPE and LLDPE are summarized in Handbook of Polyethylene by Andrew Peacock (2000; Dekker; ISBN 0824795466) at pages 43-66.

Particularly preferred as the polyolefin in the melted composition is LDPE.

It is herein understood that the term 'LDPE' includes both an LDPE homopolymer and an LDPE copolymer. The LDPE copolymer is a copolymer of ethylene and a suitable comonomer well known to the skilled person, such as alkenes, cycloalkenes and dienes. Suitable comonomers include α-olefins with 3-12 C atoms, ethylenically unsaturated carboxylic acids, ethylenically unsaturated C4-15 carboxylic acid esters or their anhydrides. Examples of suitable α-olefins to be applied as a comonomer are propylene and/or butene. Examples of suitable ethylenically unsaturated carboxylic acids are maleic acid, fumaric acid, itaconic acid, acrylic acid, methacrylic acid and/or crotonic acid. Examples of ethylenically unsaturated C4-15 carboxylic acid esters or their anhydrides are methyl(meth)acrylate, ethyl(meth)acrylate, hydroxyethyl (meth)acrylate, hydroxypropyle(meth)acrylate, n-butyl methacrylate, vinyl acetate, methacrylic acid anhydride, maleic acid anhydride, 1,4-butanedioldimethacrylate, hexanediol dimethacrylate, 1,3-butylene glycol dimethacrylate, ethylene glycol dimethacrylate, dodecane diol dimethacrylate, trimethylol propane trimethacrylate, trimethacrylate ester and/or itaconic acid anhydride. Also bifunctional alkadienes for example 1,5-hexadiene, 1,7-octadiene, 1,9-decadiene and 1,13-tetradecadiene may be applied. The quantity of comonomer in the polymer is dependent on the desired application.

Preferably, the LDPE has Mn of at least 5.0 kg/mol according to size exclusion chromatography, Mw of at least 50 kg/mol according to size exclusion chromatography, a density of 915 to 935 kg/m$^3$ according to ISO1183 and a melt flow rate of 0.10 g/10 min to 80 g/10 min according to ISO1133:2011 measured at 190° C. and 2.16 kg. Such LDPE can be obtained via the high pressure radical polymerization of ethylene in an autoclave or a tubular reactor. Such LDPE is useful for various applications such as packaging, healthcare, extrusion coating, masterbatches, foam, wire and cable, etc. Such LDPE may also be used for film blowing processes, low load commercial and retail packaging applications and trash bags. Other uses include diaper backing, shrink-wrap, vapor barriers, agricultural ground cover, and greenhouse covers, masterbatch, extrusion coating/lamination, adhesives, wire & cable insulation, flexible pipe. Injections and blow-molded items (for squeeze bottles and food storage containers) may also be suitable for use of such LDPE.

Typically, the LDPE has Mn of at most 25.0 kg/mol, for example at most 20.0 kg/mol, for example at most 17.5 kg/mol, according to size exclusion chromatography. Typically, the LDPE has Mw of at most 350 kg/mol, for example at most 330 kg/mol, for example at most 300 kg/mol, for example at most 250 kg/mol, according to size exclusion chromatography. In some embodiments, the LDPE may have Mn of 5.0-10.0 kg/mol according to size exclusion chromatography and Mw of 50-200 or 50-150 kg/mol according to size exclusion chromatography. In other embodiments, the LDPE may have Mn of 10.0-20.0 kg/mol and Mw of 150-250 or 150-200 kg/mol according to size exclusion chromatography.

The melted composition of polyolefin such as LDPE may comprise some amounts of contaminants which were present in raw materials or generated during reaction, separation, finishing processes (extrusion, pneumatic transportation, degassing) and plant operation (e.g. transitions). Examples of these contaminants include low molecular weight ethylene derived polymers, peroxide solvents, residues of initiators such as peroxides, initiator decomposition products and chain transfer agents. LDPE obtained by autoclave high pressure technology and by tubular reactor technology further contains a certain amount of ethylene. The presence of these contaminants causes problems for various applications, especially for healthcare, food packaging and wire & cable. According to the process of the invention, high purity polyolefin particles are obtained which comprise little or no amount of the contaminants which were present in the melted composition.

For obtaining higher purity particles, it is preferred that the melted composition comprises a lesser amount of contaminants. Preferably, the majority of the melted composition provided in step a) is LDPE. For example, the melted composition provided in step a) comprises at least 95 wt %, at least 97 wt %, at least 98 wt % or at least 99 wt % of the LDPE.

The melted composition provided in step a) may comprise impurities such as low molecular weight ethylene derived polymer including peroxide solvent, and ethylene.

The amount of the low molecular weight ethylene derived polymer in the melted composition provided in step a) may e.g. be at most 2000 ppm, typically 500-1500 ppm.

The amount of ethylene in the melted composition provided in step a) may e.g. be at most 3000 ppm and is typically 500-3000 ppm, 1000-2800 ppm or 1500-2500 ppm.

Further, the melted composition provided in step a) typically comprises initiators such as organic peroxides, decomposition products of the initiators and chain transfer agents. The LDPE particles obtained by step b) comprises no or essentially no amount of these compounds. Preferably, the amount of decomposition products of the initiators in the LDPE particles obtained by step b) is at most 100 ppm, more preferably at most 50 ppm, more preferably at most 30 ppm, more preferably at most 10 ppm, more preferably at most 5 ppm, more preferably at most 1 ppm, more preferably at most 0.1 ppm.

Examples of the organic peroxides include peroxyester, peroxyketone, peroxyketal and peroxycarbonate such as di-2-ethylhexyl-peroxydicarbonate, diacetylperoxydicarbonate, dicyclohexyl-peroxydicarbonate, tert.-amylperpivalate, cumyl perneodecanoate, tert.-butylperneodecanoate, tert.-butyl perpivalate, tert.-butylpermaleinate, tert.-butylperisononanoate, tert.-butylperbenzoate, tert,-butylperoxy-2-ethylhexanoate. tert.-butyl-hydroperoxide, d-tert. butyl peroxide, di-isopropylbenzol hydroperoxide, di-isononanoyl peroxide, didecanoylperoxide, cumol hydroperoxide, methyl isobutyl ketone hydroperoxide, 2.2-bis-(tert.-butylperoxy)-butane and/or 3,4-dimethyl-3,4-diphenyl hexane. Also bifunctional peroxides including for example 2,5-dimethyl-2,5-di-tertiair-butylperoxyhexane, 2,5-dimethyl-2, 5-tertiair-peroxyhexyne-3 3,6,9-triethyl-3,6,9-trimethyl-1,4, 7-triperoxononane, 3,3,6,6,9,9-hexamethyl-1,2,4,5-tetraoxacyclononane, n-ethyl-4,4-di-tertiair-butylperoxyvalerate, 1,1-di-tertiair-butylperoxy-3,3,5-trimethylcyclohexane, ethyl-3,3-di-tertiair-butylperoxybutyrate 1,1-di-tertiair-butylperoxycyclohexane, 2,2-di-tertiair-butylperoxybutane ethyl-3,3-di-tertair-amyl peroxy butyrate, 2,2-di-4,4-di-tertiair-butylperoxycyclohexyl propane, methyl-isobutyl-peroxide, 1,1-di-tertiair-amylperoxycyclohexane, 1,1-di-tertiair-butylperoxycyclohexane, 2,5-di-methyl-2,5-di-2-ethyl-hexanoylperoxyhexane and 1,4-di-tertiair-butylperoxycarbocyclohexane.

Preferably, the particles obtained by the process according to the invention comprise no or essentially no amount of low molecular weight ethylene derived polymers with 31-59 carbons as determined by mass spectrometry direct inlet probe system.

Preferably, the particles obtained by the process according to the invention comprise at most 1000 ppm, more preferably at most 500 ppm, of low molecular weight ethylene derived polymers with 10-32 carbons as determined by programmed temperature vaporization—gas chromatography—mass spectrometry.

Preferably, the melted composition of the polyolefin obtained by polymerization is directly subjected to step b) without solidification in between. Accordingly, in these cases, step a) involves polymerization of olefin monomers to obtain the melted composition of the polyolefin and the melted composition is subjected to step b) without solidification before step b). Preferably, step a) involves the steps of:

a1) polymerizing olefin monomers to obtain a composition comprising the polyolefin and olefin monomers, a2) removing the olefin monomers from the composition of step a1) by a high pressure separator and a3) removing the olefin monomers from the composition of step a2) by a low pressure separator.

When the polyolefin is LDPE, preferably step a) involves the steps of:

a1) polymerizing ethylene to obtain a composition comprising LDPE and ethylene, a2) removing ethylene from the composition of step a1) by a high pressure separator and a3) removing ethylene from the composition of step a2) by a low pressure separator.

These steps advantageously increase the purity of polyolefin such as LDPE in the polyolefin composition to be purified. This leads to the increase in the purity of the final polyolefin particles.

In step a1), olefin monomers such as ethylene are polymerized by known methods to provide a composition comprising polyolefin such as LDPE. In case of LDPE, the obtained composition from the reactor still contains a relatively large amount of ethylene, ranging from 60 wt % to 80 wt % depending on the reactor type, operating conditions, (co)monomer and product characteristics, among other variables. Step a1) is well known and extensively described e.g. in Handbook of Polyethylene by Andrew Peacock (2000; Dekker; ISBN 0824795466) at pages 43-66.

In step a2), the obtained composition is subsequently fed to a high pressure separator which removes olefin monomers such as ethylene as gas phase. In case of LDPE, the liquid phase composition comprising LDPE typically comprises from 20 wt % to 30 wt % of ethylene. In the high pressure separator, a typical pressure of 250 barg is applied. The temperature in the high pressure separator is typically from 200 to 350° C.

In step a3), the obtained composition from step a2) is subsequently fed to a low pressure separator which removes ethylene as gas phase. In the low pressure separator, a typical pressure from almost atmospheric to 4 barg is applied. The temperature in the low pressure separator is typically from 200° C. to 280° C. A melted composition typically comprising 99.00-99.90 wt % of the desired polyolefin such as LDPE is thereby obtained, which can be subjected to the PGSS.

Alternatively, step a) may also be performed by providing a solid composition comprising the polyolefin and melting the solid composition.

Typically, the polyolefin has a melt flow rate as determined using ISO1133:2011 (190° C./2.16 kg) of from 0.10 to 80 g/10 min or 0.10 to 70 g/10 min.

It was found that the successful formation of polyolefin particles is more difficult for the polyolefin with a lower MFR. Therefore the advantages of the process of the invention become more prominent when the polyolefin has a MFR of 0.10 to 50 g/10 min, 0.10 to 30 g/10 min, 0.10 to 25 g/10 min, 0.10 to 20 g/10 min, 0.10 to 15 g/10 min, 0.10 to 10 g/10 min, 0.10 to 5 g/10 min or 0.10 to 1 g/10 min, as determined using ISO1133:2011 (190° C./2.16 kg).

A further advantage of the process according to the invention is that polyolefin particles are obtained which can directly be used for certain applications such as masterbatch and carpet backing. Polyolefin particles for use in such applications typically require an average particle size of 200-1000 μm, for example 400-600 μm. In conventional processes for making polyolefin, polyolefin pellets are obtained which require mechanical grinding before being used as polyolefin particles. Such mechanical grinding step can be eliminated according to the process of the invention. This is advantageous for achieving lower production costs since no transportation and offline grinding (typically outside the polymerization plant) is needed. Accordingly, the present invention provides use of the particles obtainable by the process according to the invention for masterbatch or carpet backing, wherein the particles are not grinded.

Another aspect of the invention provides a process for making masterbatch or carpet backing by performing the process for producing polyolefin particles according to the invention, wherein the produced particles are not grinded.

Preferably, the polyolefin particles obtainable by the process according to the invention have a median particle size of 200-1000 μm, for example 400-600 μm, as determined by scanning electron microscope. The median particle size may be calculated by determining the particle size of e.g. 50-100 particles.

Collecting of Particles

The polyolefin particles formed in the spraying tower are collected from the bottom of the spraying tower. The gas phase in the spraying tower may contain finer particles. The gas phase with entrained particles may be passed through a cyclone separator to recover the particles contained therein. This increases the recovery rate of the particles.

Supercritical Fluid

The term 'supercritical fluid' is well-known and is meant a highly compressible substance in a supercritical state. The term 'supercritical fluid' is herein used interchangeably with 'the substance which forms supercritical fluid'. The supercritical fluid may be a supercritical fluid of substances such as halogenated hydrocarbons, aliphatic hydrocarbons, cyclic hydrocarbons, aromatic hydrocarbons, esters, ethers. The supercritical fluid may a supercritical fluid of substances selected from the group consisting of $CO_2$, $NH_3$, $H_2O$, $N_2O$, $CH_4$, ethane, propane, propylene, n-butane, butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether and $SF_6$ and combinations thereof.

It is an advantage of the present invention that substances having a relatively low solubility in a melted composition of a polyolefin, such as $CO_2$, can be used even when the melted composition has a relatively low flowability. The use of $CO_2$ is advantageous in that it is readily available and is inexpensive. Accordingly, in some preferred embodiments, the supercritical fluid is a supercritical fluid of $CO_2$.

In other embodiments, substances having a relatively high solubility in a melted composition of a polyolefin is advantageously used when the melted composition has a particularly low flowability. $SF_6$ has a particularly high solubility in the melted LDPE composition which leads to an easier formation of the solution saturated with $SF_6$. The high solubility of the supercritical fluid results in a large increase in the flowability of the melted LDPE composition. This reduces the risk of the clogging of the opening through which the saturated solution is expanded. Additionally, the increase in the flowability of the melted LDPE composition leads to a more uniform particle size, which may be advantageous in certain applications such as carpet backing. Accordingly, the supercritical fluid is a supercritical fluid of $SF_6$ in some preferred embodiments.

The first supercritical fluid and the second supercritical fluid may be fluids of different substances, but are preferably fluids of same substances.

Supercritical Fluid/Polyolefin Ratio

By the use of the first flow and the second flow according to the process of the invention, polyolefin particles can be obtained with a relatively low amount of the substance of the supercritical fluid. This is advantageous in that less amount of waste product is produced.

The weight ratio of the substance of the supercritical fluid to the polyolefin is preferably 1-50, for example 2-40, 3-30 or 5-10.

The weight ratio between the first flow of the supercritical fluid and the second flow of the supercritical fluid may be any ratio, as long as the amount of the first flow of the supercritical fluid is sufficient for obtaining a saturated solution of the supercritical fluid in the pressure vessel.

Typically, the weight ratio of the second flow of the supercritical fluid to the first flow of the supercritical fluid is more than 1, more typically more than 5.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The process consisting of these steps may be advantageous in that it offers a simpler, more economical process.

FIG. 1 is a schematic illustration of the apparatus used for the process according to the invention.

The apparatus comprises a pressure vessel 1 which can be supplied with a melted composition of polyolefin and a first flow of a supercritical fluid. In the pressure vessel 1, the melted composition and the first flow are mixed to obtain a solution saturated with the supercritical fluid.

The pressure vessel 1 is connected to a throttling device (nozzle) 2 via a valve 3. The valve 3 can be opened and closed to control the transfer of the solution from the pressure vessel 1 to the throttling device 2. The throttling device 2 can be supplied with a second flow of a supercritical fluid. The solution is transferred from the throttling device through its opening with a reduced diameter to the spraying tower 4. Particles are formed in the spraying tower. The particles are collected from the bottom of the spraying tower and from a cyclone. The cyclone receives gas containing fine particles from the spraying tower and recovers the fine particles from the gas.

The invention is now elucidated by way of the following examples, without however being limited thereto.

EXAMPLES

The following materials were used:

The size exclusion chromatography was performed according to ledema et. al., Polymer 54 (2013) pp. 4093-4104, section 2.2 SEC-MALS on p. 4095:

The polymer samples were dissolved (0.9 mg/ml) in 1,2,4-trichlorobenzene (TCB), which was distilled prior to use, over a period of 4 h at 150° C. and stabilized with butylated hydroxytoluene (BHT) at a concentration of 1 mg/ml. The solutions were filtered at high temperature (150° C.) using a millipore filtration setup (1.2 mm) positioned in a Hereous LUT oven operating at 150° C. The separation of the polymer according to molar mass is performed with a Polymer Laboratories PL GPC210. This SEC system is operated at high temperature (column compartment at 160° C., injector compartment at 160° C., and solvent reservoir at 35° C.), and a flow of 0.5 ml/min. Eluent is 1,2,4-trichlorobenzene. Two Polymer Laboratories SEC columns with large particle size (PLGel mixed A-LS 20 mm columns) in series are used to minimize shear degradation of high molar mass polymer chains. The light scattering detector (a WYATT DAWN EOS multi-angle laser light scattering detector) is placed in line between the SEC and the refractive index detector. The used dn/dc=0.097 ml/g.

MFR is measured at 190° C. and 2.16 kg according to ISO 1133:2011.

A high pressure/high temperature apparatus for batch micronisation as illustrated in FIG. 1 was filled with a predetermined amount of LDPE, assembled, purged and pre-pressurized with CO2 until a pressure of approximately 5 bar was reached.

The apparatus was electrically heated and the temperature was controlled to ±1° C. up to a higher temperature; subsequently CO2 was added to obtain a higher pressure. Subsequently the temperature and the pressure were adjusted up to pre-expansion conditions as summarized in Table 1 by adding CO2 until the system reached equilibrium. The apparatus was equilibrated for certain time period.

In comparative experiments A-D, no additional flow of CO2 was provided to the throttling device. The valve between the pressure vessel and the throttling device was opened to pass the solution from the pressure vessel to the throttling device and then to the spraying tower which has atmospheric pressure. Particles were not obtained in the spraying tower either because the throttling device was blocked or fiber (>1 cm) was obtained, as indicated in Tables 2-1 and 2-2.

In examples 1-4 according to the invention, before the valve between the pressure vessel and the throttling device was opened, supplying of a second flow of $CO_2$ to the throttling device was started. The valve between the pressure vessel and the throttling device was opened to pass the solution from the pressure vessel to the throttling device and then to the spraying tower which has atmospheric pressure. Particles were obtained in the spraying tower, which were collected in a collecting vessel below the spraying tower. The median particle size was determined by electronic microscopy.

TABLE 1

| | | Density (kg/m$^3$) | Mw (kg/mol) | Mn (kg/mol) | MFR (g/10 min) |
|---|---|---|---|---|---|
| LDPE 1 | 1922T from Sabic | 919 | 110 | 6.9 | 22 |
| LDPE 2 | 2501TN00 from Sabic | 925 | 280 | 20 | 0.75 |

Density is measured according to ISO1183.
Mw and Mn are determined according to size exclusion chromatography.

TABLE 2-1

| (LDPE1) | | | | | | | |
|---|---|---|---|---|---|---|---|
| Ex | Pressure (bar) | Temp (° C.) | flow LDPE (g/s) | flow $CO_2$ (g/s) | $CO_2$/ LDPE (g$CO_2$/ gLDPE) | Particle shape | recovery (%) |
| 1 | 218 | 189 | 0.23 | 6.667 | 29 | Powder | 95.1 |
| 2 | 305 | 255 | 0.629 | 16.667 | 26.5 | Powder | 97.2 |

TABLE 2-1-continued (LDPE1)

| Ex | Pressure (bar) | Temp (° C.) | flow LDPE (g/s) | flow CO$_2$ (g/s) | CO$_2$/ LDPE (gCO$_2$/ gLDPE) | Particle shape | recovery (%) |
|---|---|---|---|---|---|---|---|
| A | 218 | 189 | — | — | — | Nozzle blocked | 0 |
| B | 305 | 255 | — | — | — | Fiber (not recovered) | 0 |

TABLE 2-2

(LDPE2)

| Ex | Pressure (bar) | Temp (° C.) | flow LDPE (g/s) | flow CO$_2$ (g/s) | ratio CO$_2$/ LDPE (gCO$_2$/ gLDPE) | Particle shape | recovery (%) |
|---|---|---|---|---|---|---|---|
| 3 | 125 | 250 | 0.445 | 16.667 | 37.5 | Powder | 95.1 |
| 4 | 358 | 249 | 0.28 | 0.307 | 1.1 | Powder | 85.96 |
| C | 125 | 250 | — | — | — | Nozzle blocked | 0 |
| D | 358 | 249 | — | — | — | Nozzle blocked | 0 |

In Table 2-1 and 2-2, pressure and temperature are the pressure and the temperature in the pressure vessel, respectively. "flow LDPE" indicates the flow rate of LDPE to the pressure vessel. "flow CO2" indicates the total flow rate of the flow rate to the pressure vessel and the flow rate to the nozzle.

In comparative experiments A-D where no side injection was used, either the nozzle was blocked or fibers were formed and particles could not be obtained. In examples 1-4 wherein the conditions were the same as A-D, respectively, except that the side injection was used, particles were successfully formed. The recovery rate indicates the amount of LDPE particles recovered in the collecting vessel, excluding the amount of LDPE particles collected by cyclone. The median particle size determined by electronic microscopy from 77 particles was 453.28 μm.

The ratio CO$_2$/LDPE indicates the amount of CO2 required for the saturation of CO2 in the melted composition and for preparing the particles. A lower CO$_2$/LDPE ratio indicates a more economical process.

Comparison of Ex 3 and 4 shows that a higher pressure leads to a lower CO$_2$/LDPE ratio.

Purity of the LDPE particles obtained by Ex 4 was measured by Headspace-Gas Chromatography/Mass Spectrometry (Headspace-GC/MS) Screening, along with LDPE2 which has not been subjected to the PGSS process according to the invention. The amounts of low molecular polyolefin (such as C10-C32 hydrocarbons) were substantially lower for the LDPE particles obtained by Ex 4 than LDPE2 which has not been subjected to the PGSS process according to the invention.

The invention claimed is:

1. A process for producing polyolefin particles from a polyolefin composition, comprising the steps of:
   a) providing a melted composition of a polyolefin and
   b) providing particles from the melted composition by:
      b1) mixing a first flow of a supercritical fluid in the melted composition in a pressure vessel to obtain a solution saturated with the supercritical fluid and
      b2) passing the solution from the pressure vessel through a throttling device to a spraying tower to expand the solution to obtain the polyolefin particles in the spraying tower,
   wherein a second flow of a supercritical fluid is injected in the throttling device,
   wherein the supercritical fluid is a supercritical fluid of a substance selected from the group consisting of CO$_2$, NH$_3$, H$_2$O, N$_2$O, CH$_4$, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether, SF$_6$, and combinations thereof,
   wherein the melted composition is subjected to step b) without solidification before step b), and
   wherein the polyolefin has
      Mn of 5-10 kg/mol according to size exclusion chromatography,
      Mw of 50-150 kg/mol according to size exclusion chromatography,
      a density of 915 to 935 kg/n according to ISO1183, and
      a melt flow rate of 0.10 g/10 min to 80 g/10 min according to ISO1133:2011 measured at 190° C. and 2.16 kg.

2. The process according to claim 1, wherein the polyolefin particles have a median particle size of 200-1000 μm, wherein the weight ratio of the supercritical carbon dioxide or SF$_6$ to the polyolefin is 1:1 to 50:1, and wherein the polyolefin is low density polyethylene.

3. The process according to claim 1, wherein the weight ratio of the supercritical fluid to the polyolefin is 1:1 to 50:1.

4. The process according to claim 1, wherein the pressure vessel has a pressure of 100 to 1000 bar.

5. The process according to claim 1, wherein the pressure vessel has a temperature of 100 to 400° C.

6. The process according to claim 1, wherein the polyolefin is low density polyethylene.

7. The process according to claim 1, wherein the polyolefin has a MFR of 0.10 to 50 g/10 min, as determined using ISO1133:2011 (190° C./2.16 kg).

8. The process according to claim 1, wherein step a) involves polymerization of olefin monomers to obtain the melted composition of the polyolefin.

9. The process according to claim 1, wherein step a) involves the steps of providing a solid composition comprising the polyolefin and melting the solid composition.

10. The process according to claim 1, wherein the pressure vessel has a pressure of 200 to 600 bar.

11. The process according to claim 1, wherein the pressure vessel has a temperature of 150 to 350° C.

12. A method for making a masterbatch comprising using the particles obtained in claim 1, and without grinding the particles, forming a masterbatch.

13. A method for making a carpet backing comprising using the particles obtained in claim 1, and without grinding the particles, forming a carpet backing.

14. The process according to claim 1,
   wherein the polyolefin particles have a median particle size of 200-1000 μm;
   wherein the weight ratio of the supercritical fluid to the polyolefin is 1:1 to 50:1;
   wherein the pressure vessel has a pressure of 200 to 600 bar;
   wherein the pressure vessel has a temperature of 150 to 350° C.; and wherein the polyolefin has a MFR of 0.10 to 30 g/10 min as determined using ISO1133:2011 (190° C./2.16 kg).

15. The process according to claim 14, wherein step a) involves polymerization of olefin monomers to obtain the melted composition of the polyolefin.

16. The process according to claim 14, wherein the polyolefin has a MFR of 0.10 to 15 g/10 min as determined using ISO1133:2011 (190° C./2.16 kg).

17. A process for producing polyethylene particles from a polyethylene composition, comprising the steps of:
  a) providing a melted composition of a polyethylene and
  b) providing particles from the melted composition by:
    b1) mixing a first flow of a supercritical fluid in the melted composition in a pressure vessel to obtain a solution saturated with the supercritical fluid and
    b2) passing the solution from the pressure vessel through a throttling device to a spraying tower to expand the solution to obtain the polyethylene particles in the spraying tower,
  wherein a second flow of a supercritical fluid is injected in the throttling device,
  wherein the supercritical fluid is a supercritical fluid of a substance selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether, $SF_6$, and combinations thereof,
  wherein the polyethlene particles have a median particle size of 400-600 μm,
  wherein the melted composition is subjected to step b) without solidification before step b), and
  wherein the polyethylene
    Mn of 5-10 kg/mol according to size exclusion chromatography,
    Mw of 50-150 kg/mol according to size exclusion chromatography,
    a density of 915 to 935 kg/m³ according to ISO1183, and
    a melt flow rate of 0.10 g/10 min to 80 g/10 min according to ISO1133:2011 measured at 190° C. and 2.16 kg.

18. A process for producing polyethylene particles from a polyethylene composition, comprising the steps of:
  a) providing a melted composition of a polyethylene and
  b) providing particles from the melted composition by:
    b1) mixing a first flow of a supercritical fluid in the melted composition in a pressure vessel to obtain a solution saturated with the supercritical fluid and
    b2) passing the solution from the pressure vessel through a throttling device to a spraying tower to expand the solution to obtain the polyolefin particles in the spraying tower,
  wherein a second flow of a supercritical fluid is injected in the throttling device,
  wherein the supercritical fluid is a supercritical fluid of a substance selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, 1,1,1,2-Tetrafluoroethane, toluene, pyridine, cyclohexane, cyclohexanol, o-xylene, dimethyl ether, $SF_6$, and combinations thereof,
  wherein the polyethylene has
    an Mn of 5-10 kg/mol and an Mw of 50-200 kg/mol according to size exclusion chromatography, and
  wherein the melted composition is subjected to step b) without solidification before step b).

* * * * *